United States Patent
Choi et al.

(10) Patent No.: US 8,054,724 B2
(45) Date of Patent: Nov. 8, 2011

(54) RECORDING/REPRODUCING APPARATUS AND TRACKING CONTROL METHOD

(75) Inventors: In Ho Choi, Seongnam-si (KR); Jeong Kyo Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 12/226,990

(22) PCT Filed: Jan. 25, 2007

(86) PCT No.: PCT/KR2007/000451
§ 371 (c)(1),
(2), (4) Date: Jan. 15, 2009

(87) PCT Pub. No.: WO2007/132974
PCT Pub. Date: Nov. 22, 2007

(65) Prior Publication Data
US 2009/0316550 A1      Dec. 24, 2009

(30) Foreign Application Priority Data

May 12, 2006   (KR) .................... 10-2006-0042750
Jun. 12, 2006   (KR) .................... 10-2006-0052578

(51) Int. Cl.
*G11B 7/00* (2006.01)
(52) U.S. Cl. ............... 369/53.28; 369/53.27; 369/44.32
(58) Field of Classification Search ............... 369/53.28, 369/53.27, 44.32
See application file for complete search history.

(56) References Cited

U.S. PATENT DOCUMENTS

| | | | |
|---|---|---|---|
| 6,657,930 B1 | 12/2003 | Nomoto | |
| 7,212,485 B2 * | 5/2007 | Terashima | ............. 369/112.23 |
| 7,545,709 B2 * | 6/2009 | Takaba | ............. 369/44.29 |
| 7,808,866 B2 * | 10/2010 | Lee et al. | ............. 369/53.19 |
| 2005/0190666 A1 * | 9/2005 | Ishimoto | ............. 369/44.25 |
| 2008/0304374 A1 | 12/2008 | Verschuren | |

FOREIGN PATENT DOCUMENTS

| | | |
|---|---|---|
| CN | 1153378 | 7/1997 |
| CN | 1479283 | 3/2004 |

(Continued)

OTHER PUBLICATIONS

European Search Report dated Jan. 18, 2010 for counterpart European Patent Application No. 07708613.

(Continued)

*Primary Examiner* — Latanya Bibbins
(74) *Attorney, Agent, or Firm* — Harness, Dickey & Pierce, P.L.C.

(57) ABSTRACT

A recording/reproducing apparatus and a tracking control method which can perform data processing for reliably recording or reproducing data on or from a recording medium are disclosed. Tracking error signal (TE) is generated using difference signal (A−B) produced from reflected light from a recording medium and an offset included in the difference signal is compensated for using another reflected light received separately from the reflected light. Offset-compensated tracking error signal ((A−B)−k(C−D)) is obtained by subtracting another difference signal (C−D) produced from the separately received reflected light according to gain (k) from difference signal (A−B). Different gains may be used for areas on the recording medium having different reflectances. Thus, the tracking error signal can be compensated for an optical offset caused by lens movement and an offset caused by different reflectances and light radiated to the recording medium can accurately follow its track to perform reliable data processing.

19 Claims, 10 Drawing Sheets

FOREIGN PATENT DOCUMENTS

| | | |
|---|---|---|
| JP | 4366428 | 12/1992 |
| JP | 05-258322 | 10/1993 |
| JP | 05258322 A * | 10/1993 |
| JP | 09-265642 | 10/1997 |
| JP | 10-64086 | 3/1998 |
| JP | 10-334484 | 12/1998 |
| WO | WO 2006/013509 A1 | 2/2006 |
| WO | WO 2006/046176 | 5/2006 |

OTHER PUBLICATIONS

Japanese Office Action dated Apr. 28, 2011 for corresponding Japanese Patent Application No. 2009-510877.

Chinese Patent Gazette dated Dec. 29, 2010 for counterpart Chinese Patent Application No. 200780017225.6.

* cited by examiner

FIG. 1
Related Art
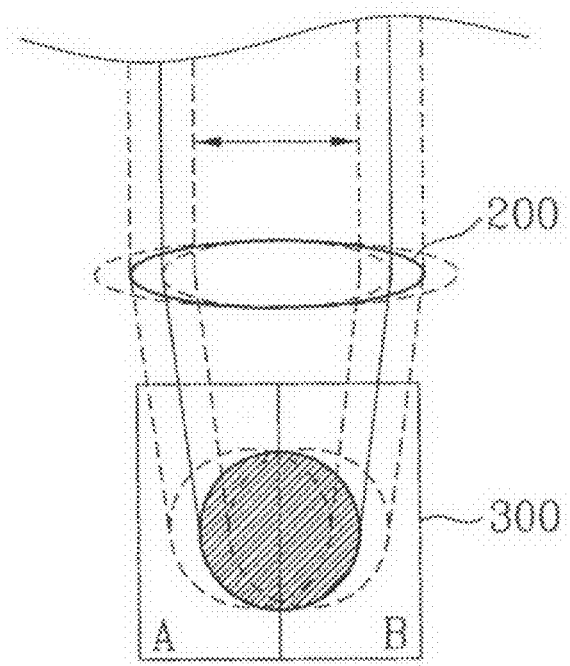
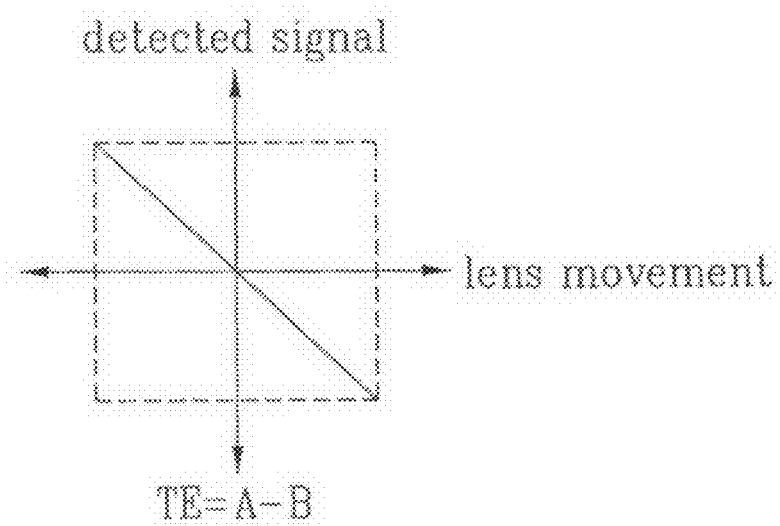

FIG. 5
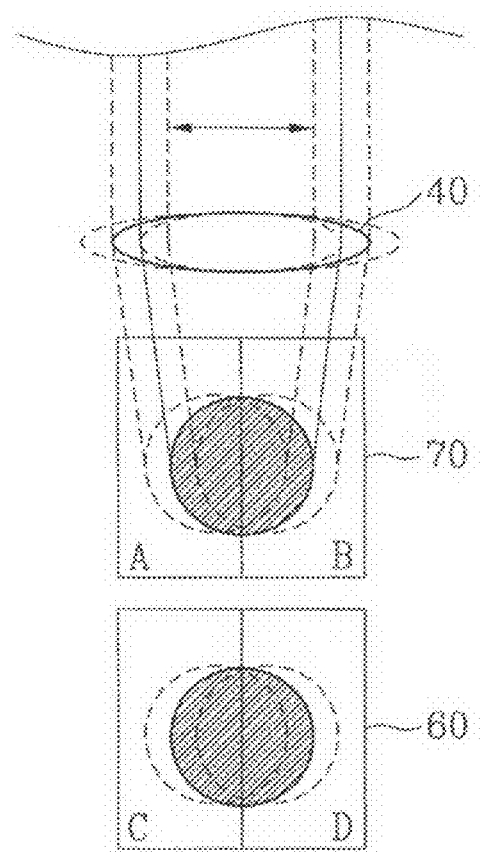
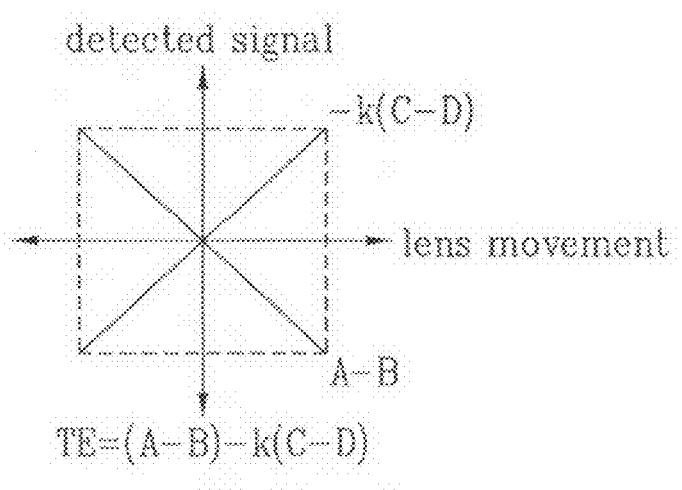

(a) (b) (c)

(a)　　　　　　　(b)　　　　　　　(c)

RECORDING/REPRODUCING APPARATUS AND TRACKING CONTROL METHOD

TECHNICAL FIELD

The present invention relates to a recording/reproducing apparatus and a tracking control method for the same, and more particularly, to an apparatus for performing data processing for reliably recording or reproducing data on or from a recording medium and a tracking control method for the same.

BACKGROUND ART

A recording/reproducing apparatus is a device that performs data processing for recording or reproducing data on or from a recording medium such as an optical disc including a compact disc (CD) or a digital versatile disc (DVD). It is necessary for the recording/reproducing apparatus to perform tracking control so as to perform data processing for recording or reproducing data on or from the recording medium while following its track.

Such conventional tracking control uses a 1-beam push-pull method. The 1-beam push-pull tracking control will now be described in detail with reference to FIG. 1. A laser beam reflected from a recording medium is incident on an optical detector 300 through an objective lens 200. The optical detector 300, which is divided into two areas A and B, converts the laser beam received through the areas A and B into electrical signals and outputs them as signals A and B. A difference signal between the signals A and B is used as a tracking error signal (TE). When the laser beam is located at the center of the track, the magnitude of the tracking error signal is minimized (i.e., TE=0). Therefore, tracking control is performed by moving the objective lens 2 left and right horizontally with respect to the recording medium so that the magnitude of the tracking error signal (TE) is minimized (i.e., TE=0). This makes it possible to control the laser beam to follow the track without leaving the track.

However, the conventional method has the following problems.

In the 1-beam push-pull method, when the objective lens is moved horizontally left and right, a laser beam incident on the optical detector is also moved horizontally left and right, thereby causing an optical offset between the areas A and B. Since the optical offset is not separated from a signal change caused by a tracking error, the optical offset causes an error in tracking control for an eccentric recording medium.

In addition, since the optical offset is not separated from a signal change caused by leaving the track when performing real-time tracking control, the optical offset causes an error in tracking control for an eccentric recording medium.

Further, the optical offset varies depending on the intensity of light reflected from the recording medium. It is difficult to cancel the optical offset of a recording medium such as a rewritable recording medium which includes both a non-recorded area having a high reflectance and a recorded area having a low reflectance.

DISCLOSURE OF INVENTION

An object of the present invention devised to solve the problems lies on providing a method and apparatus for allowing light radiated to a recording medium to accurately follow a track on the recording medium to perform reliable data processing.

Another object of the present invention devised to solve the problem lies on providing a method and apparatus for calculating a tracking error signal (TE) compensated for an optical offset to allow the radiated light to accurately follow the track in the above manner.

A further object of the present invention devised to solve the problem lies on providing a method and apparatus for calculating tracking error signals (TE) compensated for optical offsets for areas on the recording medium having different reflectances to allow the radiated light to accurately follow the track.

The object of the present invention can be achieved by providing a tracking control method which controls light to follow a track on a recording medium using a tracking error signal (TE) generated from reflected light that is received after being reflected from the recording medium, wherein the reflected light is separated to first and second reflected light and the tracking error signal (TE) is generated using a difference signal produced from the second reflected light and an offset included in the difference signal is compensated for using the first reflected light received separately from the second reflected light. Here, preferably, light radiated to the recording medium passes through a highly refractive lens so that part of the radiated light is distorted and the distorted light reflected from the recording medium is separately received as the first reflected light. In addition, preferably, the tracking error signal (TE) is generated by subtracting the difference signal produced from the first reflected light according to a gain from the difference signal produced from the second reflected light.

Preferably, the gain (k) is determined from a ratio between a change in the difference signal produced from the first reflected light and a change in the difference signal produced from the second reflected light according to lens movement. The gain (k) may also be determined by applying a sinusoidal wave to the tracking error signal (TE) and then determining a value of the gain, at which an interval between maximum and minimum values of the tracking error signal (TE) including the sinusoidal wave applied thereto is minimized, while changing the value of the gain.

In another aspect of the present invention, provided herein is a tracking control method that controls light to follow a track on a recording medium including areas having different reflectances using a tracking error signal (TE) generated from light reflected from the recording medium, wherein respective tracking error signals for the areas on the recording medium having different reflectances are generated according to different gains (k). Here, the gain (k) may be individually determined for each of first and second areas on the recording medium having different reflectances. Alternatively, gains ($k_1$ and $k_2$) for tracking error signals (TE) for the first and second areas may be determined by first determining a gain ($k_1$) for the tracking error signal for the first area and then determining a gain ($k_2$) for the tracking error signal for the second area according to a ratio between an intensity of light detected in the first area and an intensity of light detected in the second area.

In a further aspect of the present invention, provided herein is a tracking control method that controls light to follow a track on a recording medium, wherein light reflected from the recording medium is separated into first and second reflected light and light is controlled to follow a track on the recording medium using a tracking error signal (TE) generated from the second reflected light, and wherein an offset included in the tracking error signal (TE) is compensated for using the first reflected light that is received separately from the second reflected light to generate a gap error signal. Here, preferably, light radiated to the recording medium passes through a highly refractive lens and part of the light distorted while passing through the highly refractive lens is received as the first reflected light, separately from the second reflected light.

In yet another aspect of the present invention, provided herein is a recording/reproducing apparatus comprising an optical separator for separating received light, which is reflected from a recording medium after being radiated to the recording medium through a lens located at the same position, into beams of reflected light; first and second optical detectors for receiving the separated beams of the reflected light, respectively; a signal generator for generating a tracking error signal (TE) by subtracting a difference signal produced by the first optical detector according to a gain from a difference signal produced by the second optical detector; and a controller for outputting a control signal to follow a track on the recording medium according to the tracking error signal (TE). Here, preferably, the second optical detector receives the second reflected light and generates an RF signal, and the first optical detector receives the first reflected light and generates a gap error signal. In addition, the first optical detector may receive light reflected from a surface of the recording medium and the second optical detector may receive light reflected from a recording layer of the recording medium.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 illustrates an example of a 1-beam push-pull method as a conventional tracking control method.

FIG. 5 illustrates a method for generating a tracking error signal in a recording/reproducing apparatus according to an embodiment of the present invention.

BEST MODE FOR CARRYING OUT THE INVENTION

Figure 2:
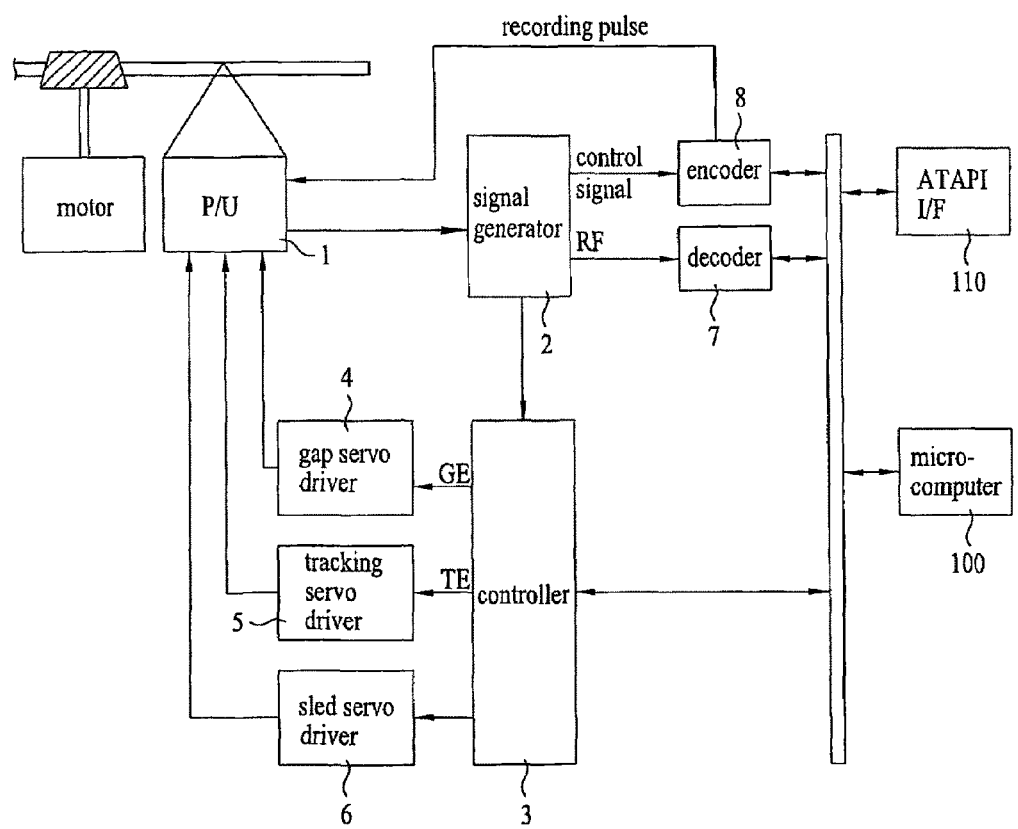
FIG. 2 illustrates the configuration of a recording/reproducing apparatus according to an embodiment of the present invention.

Reference will be made in detail to preferred embodiments of a recording/reproducing apparatus and a tracking control method for the same according to the present invention, examples of which are illustrated in the accompanying drawings. The above and other objects, features and other advantages of the present invention will be more clearly understood from the following detailed description of the embodiments taken in conjunction with the accompanying drawings.

Although most terms used in the present invention have been selected from general ones widely used in the art, some terms have been arbitrarily selected by the applicant and their meanings are explained in detail in the following description as needed. Thus, the present invention should be understood with the intended meanings of the terms rather than their simple names or meanings.

The recording/reproducing apparatus according to the present invention is constructed to be able to radiate light to a recording medium to perform data processing for recording or reproducing data on or from a recording layer of the recording medium. For accurate and reliable data processing, it is necessary to control a position on the recording medium to which light is radiated through an optical pickup.

In the present invention, the recording/reproducing apparatus is constructed to separate light reflected from a recording medium into a plurality of light beams and receive the separated light beams and then to perform tracking control according to a tracking error signal (TE) produced from the separately received light beams so as to allow the light to be radiated to an accurate position on the recording medium. Although the present invention will be described in detail by taking as an example a near-field recording/reproducing apparatus that separates and receives beams of light reflected from a surface and a recording layer of a recording medium, the present invention can be applied to other recording/reproducing apparatuses in the same manner. The term "recording/reproducing apparatus" used in the present invention refers to any apparatus capable of recording or reproducing data on or from the recording medium. The term "recording medium" used in the present invention refers to any data storage medium including, for example, any recording type of medium such as an optical disc, a magnetic disc, or a magnetic tape. Although, for ease of explanation, the recording/reproducing apparatus will be exemplified by a recording/reproducing apparatus using near-field light in the embodiments of the present invention, the present invention is not limited to the recording/reproducing apparatus using near-field light.

Reference will now be made in detail to preferred embodiments of a recording/reproducing apparatus according to the present invention, examples of which are illustrated in the accompanying drawings. Wherever possible, the same reference numbers will be used throughout the drawings to refer to the same or like parts.

FIG. 2 schematically shows the configuration of a recording/reproducing apparatus according to an embodiment of the present invention. The following is a detailed description of the configuration of the recording/reproducing apparatus with reference to FIG. 2 and other drawings.

Figure 3:
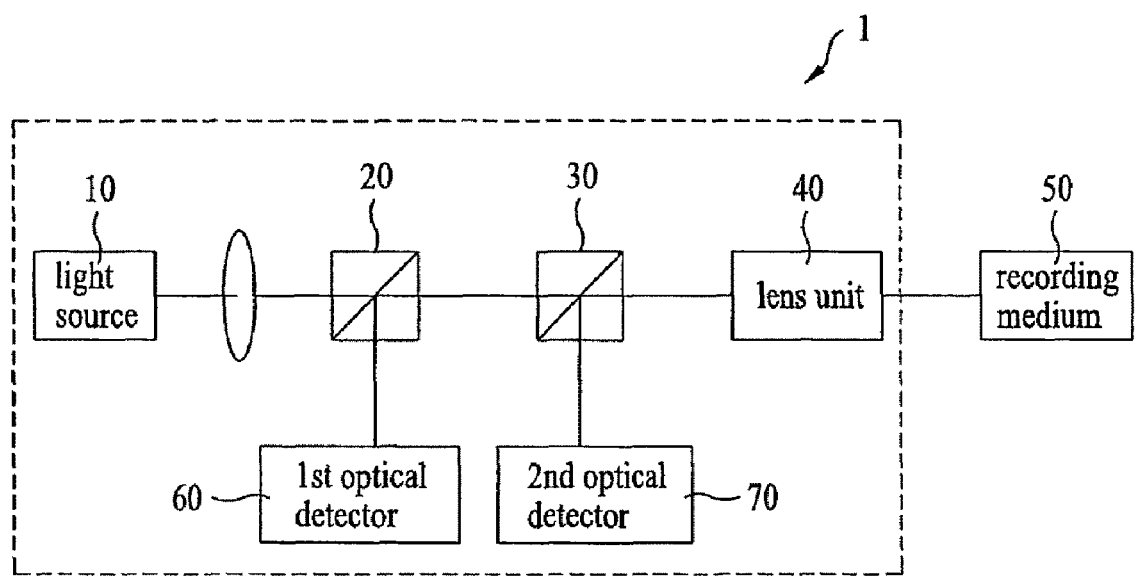
FIG. 3 illustrates a recording medium and an optical system of an optical pickup included in a recording/reproducing apparatus according to the present invention.

An optical pickup (P/U) 1 radiates light to a recording medium and receives light reflected from the recording medium and then generates a corresponding signal. An example configuration of an optical system included in the optical pickup 1 is illustrated in FIG. 3. The optical system included in the optical pickup 1 may include a light source 10, a separating/combining portion 20 and 30, a lens unit 40, and optical detectors 60 and 70. The components of the optical pickup 1 will now be described in detail.

A laser that produces a nearly parallel, highly concentrated beam of coherent light may be used as the light source 10. Specifically, a laser diode may be used as the light source 10.

The optical pickup 1 may further include a lens such as a collimator that is provided in the path of beams of light emitted from the light source 10 to make the emitted light beams parallel to each other so that beams of light radiated to the recording medium are parallel to each other.

The separating/combining portion 20 and 30 separates beams of light incident in the same direction or combines beams of light incident in different directions. In this embodiment, the optical pickup 1 includes first and second separating/combining portions 20 and 30. The following is a description of details of the first and second separating/combining portions 20 and 30. The first separating/combining portion 20 passes one part of an incident beam of light and reflects another part thereof. For example, a non-polarized beam splitter (NBS) may be used as the first separating/combining portion 20. The second separating/combining portion 30 passes only light polarized in a specific direction. For example, a polarized beam splitter (PBS) may be used as the second separating/combining portion 30. Specifically, the second separating/combining portion 30 may be constructed so as to pass a vertically polarized component of linearly polarized light and to reflect a horizontally polarized component thereof. The second separating/combining portion 30 may also be constructed so as to pass a horizontally polarized component of linearly polarized light and to reflect a vertically polarized component thereof.

Figure 4:
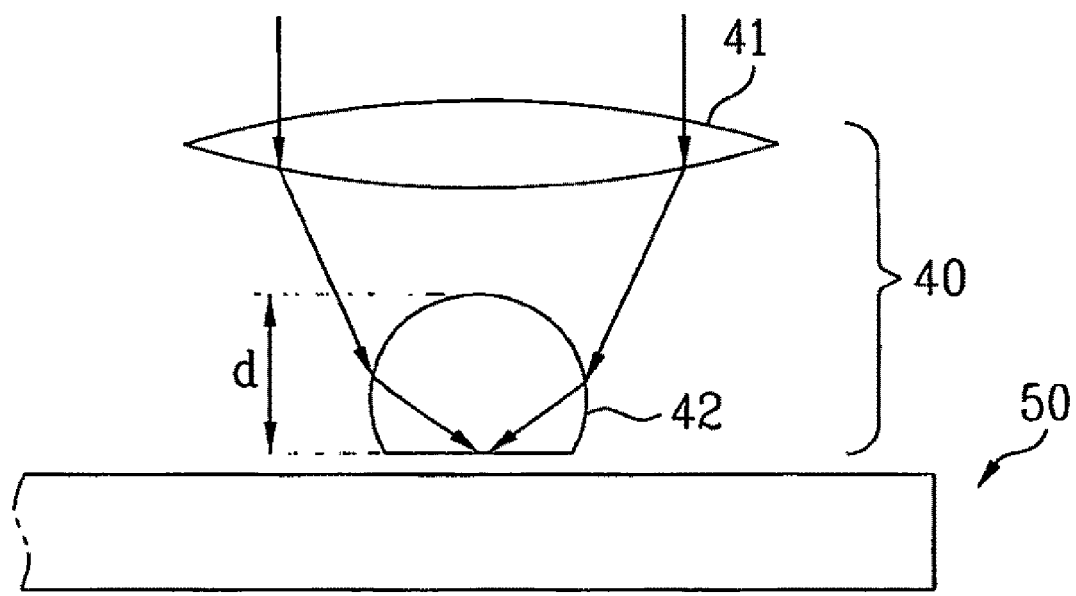
FIG. 4 is a schematic sectional view illustrating a lens unit of the optical pick-up according to the first embodiment of the present invention together with a recording medium.

The lens unit 40 directs light emitted from the light source 10 to the recording medium 50. Specifically, the lens unit 40 in this embodiment includes, as shown in FIG. 4, an objective lens 41 and a highly refractive lens 42 that is provided in the path of light that is incident on the recording medium after passing through the objective lens 41. By including the highly refractive lens 42 in addition to the objective lens 41, the optical pickup 1 increases the numerical aperture of the objective lens 41 and produces an evanescent wave through the highly refractive lens 42. For ease of explanation, the highly refractive lens 42 will now be referred to as a "near-field generation lens". A solid immersion lens (SIL) may be used as the near-field generation lens 42, which may use a hemispherical or hyper hemispherical lens which is formed by cutting a spherical lens. Here, the term "hyper hemisphere" refers to a part of a sphere whose thickness is between the thickness of the sphere and the thickness of its hemisphere. The cut section of the near-field generation lens 42 may be ground in the form of a circular cone and the circular cone may be formed to have an area at its end so that beams of light are concentrated at the end of the circular cone.

The optical system of the optical pickup including the lens unit 40 is located very close to the recording medium 50. The following is a detailed example. If the lens unit 40 and the recording medium 50 are located at a distance less than about a quarter of the wavelength of light (i.e., $\lambda/4$), the evanescent wave produced through the lens unit 40 can maintain its characteristics so that it can be used for recording and reproduction. However, if the lens unit 40 and the recording medium 50 are located at a distance greater than $\lambda/4$, light radiated from the lens unit 40 loses the characteristics of the evanescent wave and returns to its original wave. Therefore, recording/reproducing apparatuses using near-field light generally maintain the interval between the lens unit 40 and the recording medium 50 so as not to exceed about $\lambda/4$ which is the range of near-field light.

The optical detectors 60 and 70 receive and photo-electrically convert reflected light to produce an electrical signal corresponding to the intensity of the reflected light. In this embodiment, the optical pickup 1 includes two optical detectors, i.e., the first optical detector 60 and the second optical detector 70. Each of the first and second optical detectors 60 and 70 may include, for example, two optical detection elements (PDA and PDB) which are divided in a specific direction of the recording medium 50 such as its track or radial direction. The optical detection elements (PDA and PDB) generate electrical signals A and B having levels proportional to their received light intensities. Each of the first and second optical detectors 60 and 70 may also include four optical detection elements (PDA, PDB, PDC, and PDD) which are divided into two in each of the track and radial directions of the recording medium 50. The configuration of the optical detection elements included in the optical detectors 60 and 70 is not limited to the configurations described in the embodiments and may be modified in various ways as needed.

Using the signal generated by the optical pickup 1, the signal generator 2 generates an RF signal required for data reproduction and a gap error signal (GE) and a tracking error signal (TE) required for servo control as shown in FIG. 2. The signal generator 2 may be constructed to compensate for an offset which may be included in the generated signal and thus to generate an offset-compensated signal. For example, the signal generator 2 may be constructed to compensate for an optical offset included in the tracking error signal (TE) due to lens movement or an offset caused by different intensities of reflected light. The offset compensation may also be performed by the controller 3 or by another component other than the signal generator 2. The process for generating a signal through the signal generator 2 will be described later with reference to the drawings.

The controller 3 receives signals generated by the optical detectors 60 and 70 or by the signal generator 2 and generates control or drive signals. For example, the controller 3 processes the gap error signal (GE) and outputs a drive signal for controlling the interval between the lens unit 40 and the recording medium 50 to a gap servo driver 4. The controller 3 also processes the tracking error signal (TE) and outputs a drive signal for tracking control to a tracking servo driver 5.

The gap servo driver 4 drives an actuator (not shown) in the optical pickup 1 to move the optical pickup 1 or the lens unit 40 in the optical pickup 1 vertically. This makes it possible to maintain the interval between the lens unit 40 and the recording medium 50 constant. The gap servo driver 4 may double as a focus servo. For example, according to a signal for focus control from the controller 3, the gap servo driver 4 may allow the optical pickup 1 or the lens unit 40 in the optical pickup 1 to follow vertical movement of the recording medium 50 as the recording medium 50 rotates.

The tracking servo driver 5 drives a tracking actuator (not shown) in the optical pickup 1 to move the optical pickup 1 or the lens unit 40 in the optical pickup 1 in a radial direction to correct the position of light on the recording medium 50. This allows the optical pickup 1 or the lens unit 40 in the optical pickup 1 to follow a track defined on the recording medium 50. In response to a track shift command, the tracking servo driver 5 can move the optical pickup 1 or the lens unit 40 in the optical pickup 1 in a radial direction.

In response to a track shift command, a sled servo driver 6 can move the optical pickup 1 in a radial direction by driving a sled motor (not shown) provided for moving the optical pickup 1.

A host such as a PC may be connected to such a recording/reproducing apparatus. The host transmits a recording/reproducing command to a microcomputer 100 through an interface, receives reproduced data from a decoder 7, and transmits data to be recorded to an encoder 8. According to a recording/reproducing command from the host, the microcomputer 100 controls the decoder 7, the encoder 8, and the controller 3.

Generally, an Advanced Technology Attached Packet Interface (ATAPI) 110 can be used as the interface. The ATAPI 110 is a standard interface between a host and an optical recording/reproducing apparatus such as a CD or DVD driver. This standard interface has been suggested to transmit data decoded by the optical recording/reproducing apparatus to the host and functions to convert the decoded data into packet data that can be processed by the host.

The procedure of operations of the recording/reproducing apparatus will now be described in detail with reference to the travel direction or path of light emitted from the light source 10 in the optical system and with reference to the flow of signals in other components.

Light emitted from the light source 10 in the pickup 1 is incident on the first separating/combining portion 20. Part of the incident light is reflected from the first separating/combining portion 20 and another part thereof passes through it to be incident on the second separating/combining portion 30. The second separating/combining portion 30 passes a vertically polarized component of the linearly polarized light and reflects a horizontally polarized component. The second separating/combining portion 30 may also be constructed to pass the horizontally polarized component and reflect the vertically polarized component. A polarization change plate (not shown) may be further provided in the path of light that has passed through the second separating/combining portion 30. Details of the polarization change plate will be described later.

The light that has passed through the second separating/combining portion 30 is incident on the lens unit 40. The light incident on the objective lens in the lens unit 40 passes though the near-field generation lens to generate an evanescent wave. Specifically, light incident on the near-field generation lens at greater than a threshold angle is totally reflected between a surface of the lens and a surface of the recording medium 50. On the other hand, light incident on the near-field generation lens at the threshold angle or less is reflected from a recording layer of the recording medium 50. An evanescent wave produced in this process reaches the recording layer of the recording medium to perform recording/reproduction.

Light reflected from the recording medium 50 is incident on the second separating/combining portion 30 through the lens unit 40. As described above, a polarization change plate (not shown) may be provided in the path of light that is incident on the second separating/combining portion 30. The polarization change plate changes the polarization direction of light that is incident on the recording medium 50 and that of light that has been reflected from the recording medium 50. For example, when a quarter wave plate (QWP) is used as the polarization change plate, it left-circularly polarizes light that is incident on the recording medium 60 and right-circularly polarizes light that has been reflected from the recording medium 60 to travel in the opposite direction to the incident light. As a result, the polarization direction of the reflected light that has passed through the quarter wave plate differs from that of the incident light by an angle of 90 degrees. When only a vertically polarized component of incident light passes through the second separating/combining portion 30, the light has only a horizontally polarized component when it has returned to the second separating/combining portion 30 after being reflected from the recording medium 50. Thus, the second separating/combining portion 30 reflects the returned light having a horizontally polarized component to be incident on the second light detector 70. In the meantime, since the numerical aperture of the lens unit 40 in the near-field recording/reproducing apparatus according to the present invention is greater than "1", the polarization of light is distorted while it is radiated and reflected through the lens unit 40. That is, part of the reflected light that is incident on the second separating/combining portion 30 also has a vertically polarized component due to the polarization distortion so that it passes through the second separating/combining portion 30. After passing through the second separating/combining portion 30, the reflected light is incident on the first separating/combining portion 20. The first separating/combining portion 20 passes one part of the incident light and reflects another part thereof. The light reflected from the first separating/combining portion 20 is incident on the first optical detector 60.

The first optical detector 60 and the second optical detector 70 output electrical signals corresponding to the received intensities of the reflected light. Using the electrical signals output from the optical detectors 60 and 70, the signal generator 2 produces a gap error signal (GE), a tracking error signal (TE), and an RF signal. For example, when each of the first and second optical detectors 60 and 70 includes two optical detection elements, the two optical detection elements included in the first optical detector 60 output electrical signals C and D corresponding to their received light intensities. The two optical detection elements included in the second optical detector 70 output electrical signals C and D corresponding to their received light intensities. Using the signals C and D output from the first optical detector 60, the signal generator 2 can generate a gap error signal (GE) for controlling the interval between the lens and the recording medium. Specifically, the signal generator 2 obtains the sum (C+D) of the levels of the signals C and D output from the optical detection elements included in the first optical detector 60 to generate the gap error signal (GE). Since the level of the gap error signal (GE) is proportional to the interval between the lens unit 40 and the recording medium 50, it is possible to adjust the interval using the gap error signal (GE). In addition, the signal generator 2 can generate an RF signal or a tracking error signal (TE) using a signal generated by the second optical detector 70. This allows accurate data recording or reproduction.

A method for generating a tracking error signal (TE) and performing tracking control to reliably record and reproduce data will now be described in detail. First, a detailed example of a method for generating a tracking error signal (TE) for accurate tracking control is described with reference to the drawings.

Figure 6:
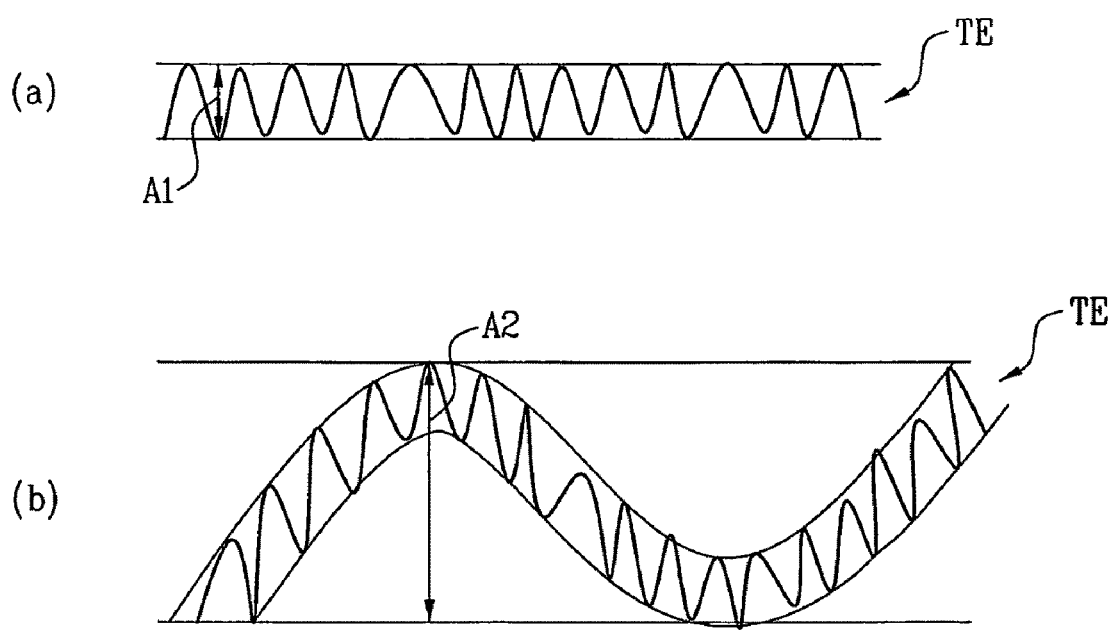
FIGS. 6A and 6B illustrate examples of detected tracking error signals.

FIG. 5 illustrates a method for generating a tracking error signal (TE) in a recording/reproducing apparatus according to an embodiment of the present invention. The tracking error signal generation method will also be described in detail with reference to FIGS. 6 and 7 where the same reference numbers are used to refer to the same or like parts. As shown in FIG. 5, each of the first and second optical detectors 60 and 70 may be divided into two or four detection elements of different areas and various modifications are possible as needed.

In this embodiment, using a signal output from the second optical detector 70, the signal generator 2 can generate a tracking error signal (TE) according to a 1-beam push-pull method as described above with reference to FIG. 1. Details of this method are as follows.

The second optical detector 70, which is divided into two areas A and B, converts the reflected light received through the areas A and B into electrical signals and outputs them as signals A and B. When light is reflected from the recording medium 50 at the center of its track, the reflected light is received through the second optical detector 70 at the center of its detection areas. Therefore, the levels of the signals A and B are equal to each other so that the difference is zero (A−B=0). On the other hand, when light is reflected from the recording medium 50 at a position deviated from the center of its track, the reflected light is received through the second optical detector 70 at a position deviated from the center of its detection areas so that the levels of the signals A and B output from the second optical detector 70 differ from each other.

This method is based on the fact that signals produced from light reflected from the recording medium 50 provide a balanced and symmetric optical distribution when light incident on the recording medium 50 is located at the center of its track and provide a non-symmetric optical distribution when the incident light deviates from the center of the track as described above. Thus, the difference (A−B) between the levels of the signals A and B output from the second optical detector 70, which indicates whether or not the output signals are symmetric, can be used as a tracking error signal (TE) that is an error signal for tracking control. Thus, it is possible to control the lens unit 40 to follow the track while moving the lens unit 40 horizontally with respect to the recording medium 40 so that the tracking error signal (TE) is minimized.

The tracking error signal (TE) detected by the second optical detector 70 may include an optical offset. Specifically, when there is no optical offset, the tracking error signal (TE) detected by the second optical detector 70 can generate a sinusoidal wave having an amplitude of "A1" as shown in FIG. 6A. The term "amplitude" used in the description of the present invention refers to the maximum displacement of a vibrating signal from its minimum value rather than its average value as denoted by "A1" and "A2" in FIGS. 6A and 6B. On the other hand, when the lens unit 40 moves, the tracking error signal changes according to its movement to generate a sinusoidal wave that varies with the maximum and minimum values having an interval therebetween of about "A2" as shown in FIG. 6B. When using the tracking error signal (TE) as shown in FIG. 6B, it is difficult to perform accurate tracking control and errors also occur when performing tracking control using the tracking error signal (TE).

Therefore, it is necessary to compensate for an offset of the tracking error signal of FIG. 6B, which is a component of the signal varying according to the movement of the lens unit 40, thereby detecting a sinusoidal wave as shown in FIG. 6A. To accomplish this, the present invention compensates for the optical offset of the tracking error signal (TE) using a signal detected by the first optical detector 60.

Figure 7:
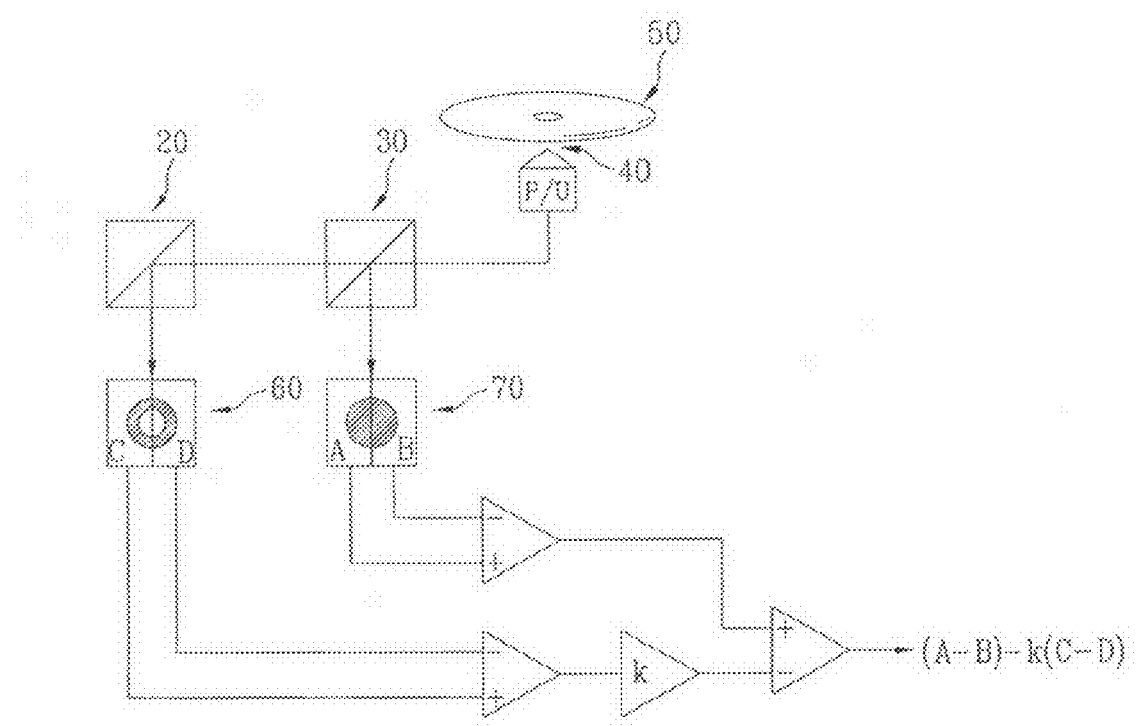
FIG. 7 illustrates how a tracking error signal is generated in the recording/reproducing apparatus according to an embodiment of the present invention.

FIG. 7 schematically illustrates a method in which a tracking error signal (TE) detected by the second optical detector 70 is compensated using a signal detected by the first optical detector 60 and an offset caused by movement of the lens unit 40 is canceled to generate an offset-compensated tracking error signal (TE).

As shown in FIG. 7, in the present invention, each of the first and second optical detectors 60 and 70 separates and receives light that has been radiated and reflected with the lens unit 40 being located at the same position. Therefore, as the lens unit 40 moves horizontally left and right, the reflected light that is incident on the first optical detector 60 moves horizontally left and right in conjunction with the reflected light that is incident on the second optical detector 70. Therefore, the optical offset caused by the lens movement can be detected using the reflected light detected by the first optical detector 60. An offset-compensated tracking error signal (TE) can be detected by compensating a difference signal detected by the second optical detector 70 for the detected offset. Here, the difference signal refers to a tracking error signal (TE) detected by the second optical detector 70. Details of this method are as follows.

The signal generator 2 generates a difference signal indicating the difference between the levels of the signals A and B output from the second optical detector 70. A description of this process is omitted since it has already been described above. The signal generator 2 detects an optical offset using a signal detected by the first optical detector 60. The first optical detector 60, which is divided into two areas C and D, converts the reflected light received through the areas C and D into electrical signals and outputs them as signals C and D. A value "k(C−D)" proportional to the difference (C−D) between the levels of the signals C and D output from the first optical detector 60 corresponds to an optical offset component caused by lens movement, which is included in the difference signal (A−B). The gain "k" corresponds to the ratio between respective changes in the two difference signals generated by the first and second optical detectors 60 and 70 according to lens movement. The optical offset-compensated tracking error signal (TE) generated by the signal generator 2 can be expressed by the following equation.

$$TE = (A-B) - k(C-D) \quad \quad [\text{Equation 1}]$$

That is, the signal generator 2 subtracts the product of the gain "k" and the difference signal (C−D) output from the first optical detector 60 from the difference signal (A−B) generated by the second optical detector 70. The value "k(C−D)" proportional to the difference (C−D) between the signals C and D corresponds to an optical offset component caused by lens movement, which is included in the difference signal (A−B). The gain "k" corresponds to the ratio between respective changes in the two difference signals generated by the first and second optical detectors 60 and 70 according to lens movement. The gain "k" has different values for recorded and non-recorded areas of the recording medium.

In this embodiment, a signal output from the first optical detector 60 can be used to maintain the interval (or gap) between the recording medium 50 and the lens unit 40. Specifically, the signal generator 2 shown in FIG. 2 generates a gap error signal (GE) by summing signals output from the first optical detector 60 and can control the interval between the recording medium 50 and the lens unit 40 to be maintained constant by maintaining the gap error signal (GE) constant. The level of the gap error signal (GE) corresponds to the sum (C+D) of signals output to have levels proportional to the intensity of reflected light, which can be made to be proportional to the interval between the recording medium 50 and the lens unit 40 in the near-field range. In this embodiment, it is possible to compensate the tracking error signal (TE) for its optical offset caused by lens movement using a signal detected by the first optical detector 60 provided to generate the gap error signal (GE).

Detailed embodiments of the method for determining the gain "k" are described below.

A first embodiment of the method for determining the gain "k" will now be described with reference to FIGS. 8A to 8C. The first and second optical detectors 60 and 70 receive and convert reflected light into electrical signals and output them as AC (RF) signals. According to this embodiment, it is possible to calculate the gain "k" by directly measuring changes in signals generated by the first and second optical detectors 60 and 70 while arbitrarily moving the lens unit 40.

Figure 8:
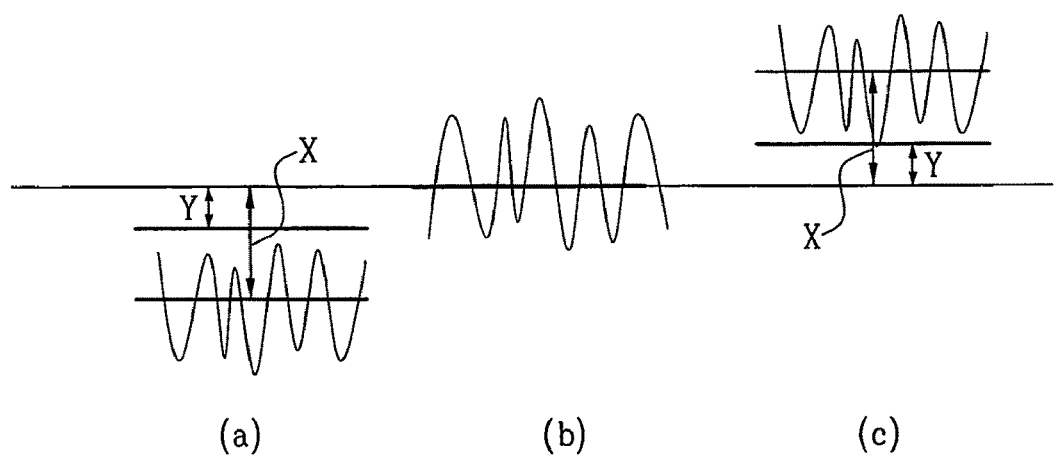
FIGS. 8A to 8C illustrate a first embodiment of a method for determining a gain in the tracking error signal generation method according to the present invention.

FIGS. 8A to 8C illustrate changes in the difference signal (A−B) generated by the second optical detector 70 and changes in the difference signal (C−D) generated by the first optical detector 60 according to movement of the lens unit 40.

Specifically, FIG. 8A shows changes in the difference signals when the lens unit 40 is moved to the left, FIG. 8B shows changes in the difference signals when the lens unit 40 is located at a position corresponding to the center of the track, and FIG. 8C shows changes in the difference signals when the lens unit 40 is moved to the right. Since the tracking error signal (TE) is an AC signal, the average of the output AC signal is shown by a solid line for ease of explanation and a change in the average is detected.

If "X" denotes a change in the average of the difference signal (A−B) generated by the second optical detector 70 and "Y" denotes a change in the average of the difference signal (C−D) generated by the first optical detector 60 when the lens unit 40 is moved to the left or right from the position of the lens unit 40 corresponding to the center of the track as shown in FIG. 8B, the gain "k" can be obtained using a method as expressed by Equation 2.

$$k = \frac{X}{Y} \quad \text{[Equation 2]}$$

That is, changes in the reflected light received through the first and second optical detectors 60 and 70 are detected while the lens unit 40 is moved horizontally left and right to a certain extent. The detected changes represent changes in the difference signals generated by the optical detectors, respectively. Accordingly, the gain "k" can be determined by calculating the ratio between the changes (specifically, the ratio between the respective magnitudes of the changes).

A second embodiment of the method for determining the gain "k" will now be described with reference to FIGS. 9A to 9C. A sinusoidal wave is applied to a tracking error signal (TE=(A−B)−k(C−D)) detected while the lens unit 40 is repeatedly shaken horizontally left and right. Initially, the gain "k" is fixed. Then, the maximum and minimum levels of a signal produced by applying the sinusoidal wave to the tracking error signal (TE) are detected while changing the gain "k". Then, a value of the gain "k" at which the interval between the maximum and minimum levels is minimized is detected.

Figure 9:
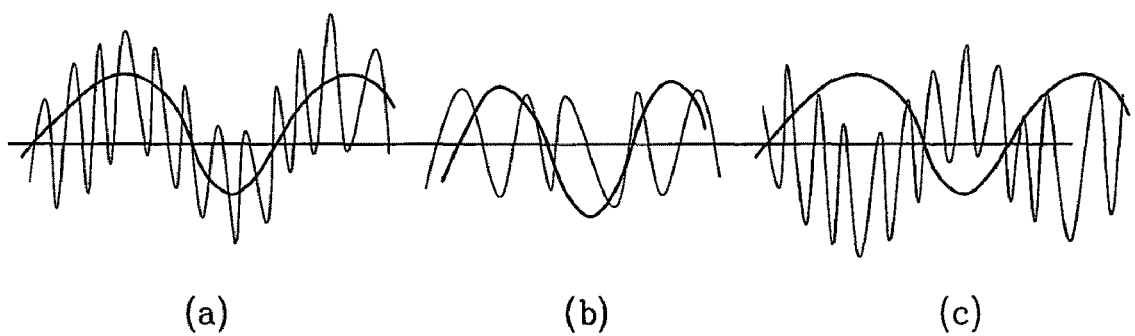
FIGS. 9A to 9C illustrate a second embodiment of a method for determining a gain in the tracking error signal generation method according to the present invention.

FIGS. 9A to 9C illustrate changes in tracking error signals (TE) as the gain "k" varies when the lens unit 40 is shaken horizontally left and right while applying a sinusoidal wave to the tracking error signals (TE). When the gain "k" is less than the ratio "(A−B)/(C−D)" between respective changes in the error signals from the first and second optical detectors 60 and 70 according to movement of the lens unit 40, a change (i.e., offset) caused by the movement of the lens unit 40 is not canceled and remains in the error signal. Accordingly, as shown in FIG. 9A, the detected tracking error signal (TE) varies with the same polarity as that of the applied sinusoidal wave and has a large interval between the maximum and minimum levels. When the gain "k" is equal to the ratio "(A−B)/(C−D)" between respective changes in the error signals from the first and second optical detectors 60 and 70 according to movement of the lens unit 40, an offset caused by the movement of the lens unit 40 is canceled and the detected tracking error signal (TE) has a sinusoidal wave form as shown in FIG. 6A. Accordingly, the interval between the maximum and minimum levels of the detected tracking error signal (TE) (i.e., the amplitude of the signal (TE)) is minimized as shown in FIG. 9B. On the other hand, when the gain "k" is greater than the ratio "(A−B)/(C−D)" between respective changes in the error signals from the first and second optical detectors 60 and 70 according to movement of the lens unit 40, more than the offset caused by the movement of the lens unit 40 is subtracted from the error signal from the second optical detector 70. Accordingly, as shown in FIG. 9C, the detected tracking error signal (TE) varies with the opposite polarity to that of the applied sinusoidal wave and has a large interval between the maximum and minimum levels.

The gain "k" can be determined by finding a value of the gain "k", at which the amplitude of the tracking error signal is minimized, while changing the value of the gain "k" after fixing the gain "k" initially and then applying a sinusoidal wave to the tracking error signal (TE) in the above manner.

On the other hand, the gain "k" has different values for different intensities of reflected light. Thus, to perform tracking control, it is necessary to determine different values of the gain "k" according to the intensities of reflected light. A detailed embodiment of the method for determining different gains "k" for different intensities of reflected light is described below with reference to the drawings. Although this embodiment will be exemplified by a recording medium that includes recorded and non-recorded areas which provide different intensities of reflected light, the present invention is not limited to such a recording medium. The intensity of light, which is received by the second optical detector 70 after being reflected from the recording layer (not shown) of the recording medium 50, is high when the light is reflected from the non-recorded area (not shown) having a high reflectance and is low when the light is reflected from the recorded area (not shown) having a relatively low reflectance. On the other hand, the intensity of light, which is received by the first optical detector 60 after being reflected from the surface of the recording medium 50, does not depend on whether or not the light is reflected from the recorded area and has values predetermined according to the intervals between the lens unit 40 and the recording medium 50. That is, when light is reflected from areas having different reflectances, only the second optical detector 70 receives reflected light beams of different intensities. As the intensity of reflected light increases, the change (X) in the difference signal (A−B) generated by the second optical detector 70 increases and the gain "k" must be corrected accordingly.

A third embodiment of the method for determining the gain "k" will now be described. A first gain "$k_1$" is determined for the recorded area using the method according to the first or second embodiment. A second gain "$k_2$" is determined for the non-recorded area using the same method. During a recording/reproducing operation, tracking control can be performed with a tracking error signal (TE) that is generated using the first gain "$k_1$" for the recorded area and using the second gain "$k_2$" for the non-recorded area.

Figure 10:
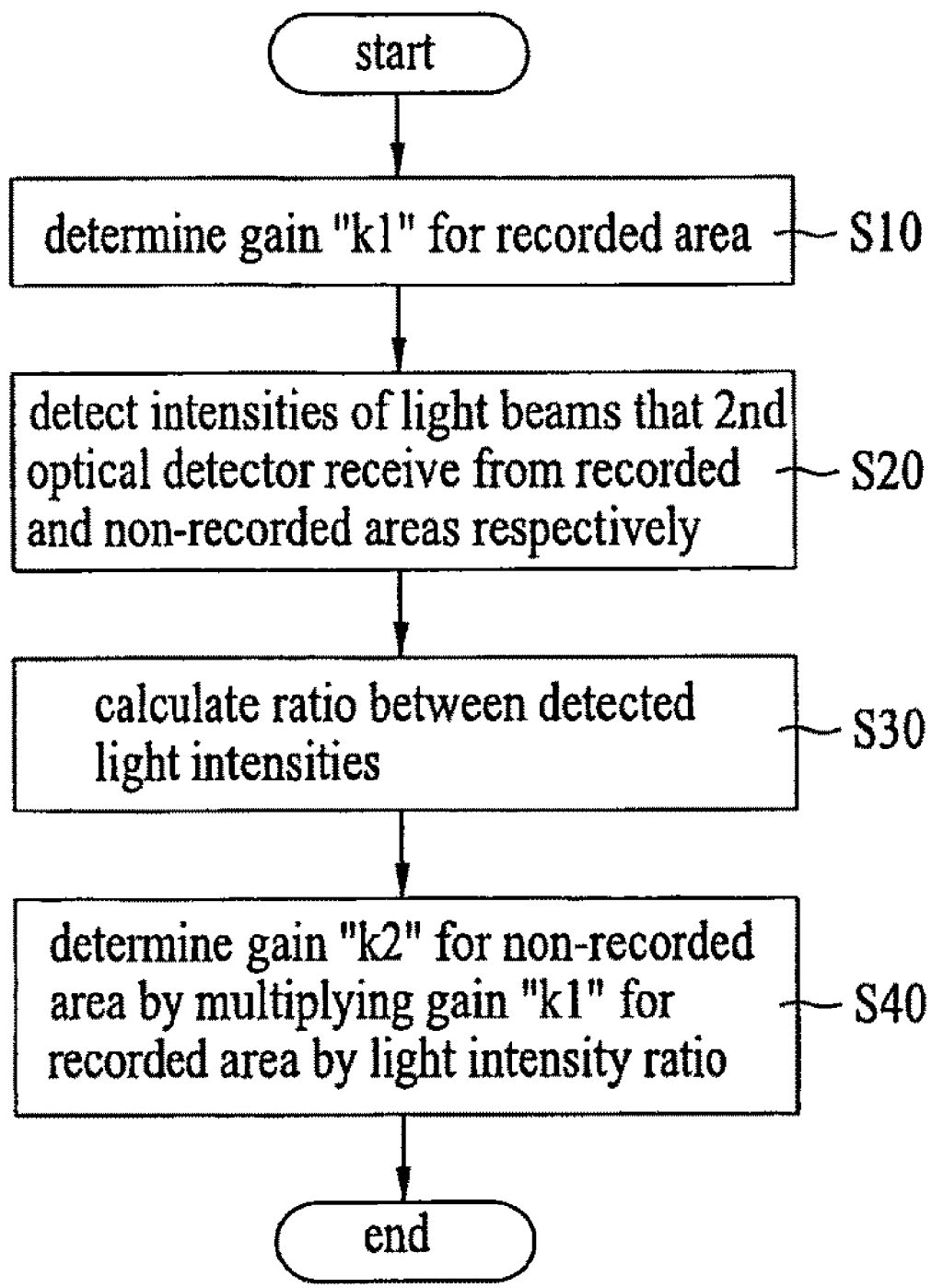
FIG. 10 illustrates a fourth embodiment of a method for determining gains in the tracking error signal generation method according to the present invention.

A fourth embodiment of the method for determining the gain "k" will now be described. After a gain "$k_2$" for the recorded area is determined, a gain "$k_2$" for the non-recorded area can be calculated according to the ratio of intensities of light reflected from the recorded and non-recorded areas having different reflectances, the ratio having a value corresponding to the difference between the reflectances. Details of this method are described below with reference to FIG. 10.

First, a gain "$k_1$" for the recorded area is determined (S10). This gain "$k_1$" can be determined according to the method of the first or second embodiment. The gain "$k_2$" for the non-recorded area may also be first determined so that the gain "$k_1$" is determined based on the gain "$k_2$".

The intensity of light received by the second optical detector 70 is detected for each of the recorded and non-recorded areas (S20). Then, the ratio between the light intensity (R) detected in the recorded area and the light intensity (N) detected in the non-recorded area is determined (S30). The gain "$k_2$" for the non-recorded area can be calculated by multiplying the gain "$k_1$" for the recorded area by the determined light intensity ratio as expressed by the following Equation 2.

$$k_2 = k_1 \frac{\text{light intensity detected in non-recorded area}}{\text{light intensity detected in recorded area}} \quad [\text{Equation 3}]$$

The operation of the near-field recording/reproducing apparatus according to the present invention will now be described in detail with reference to an example where data is recorded on a rewritable recording medium. A user activates a servo in order to record or reproduce data on or from a recording medium using a recording/reproducing apparatus. Here, it is assumed that the recording medium includes a recorded area which contains data and a non-recorded area which contains no data. Light emitted from the light source 10 in the recording/reproducing apparatus is radiated to the recording medium 50 through the lens unit 40 so as to record data on the recording medium 50 which is rotating.

From the light reflected from the recording medium 50, the first and second optical detectors 60 and 70 produce electrical signals. The signal generator 2 produces a tracking error signal (TE) using the electrical signals. Specifically, while moving the lens unit 40 horizontally left and right in the recorded area, the signal generator 2 detects changes in signals detected by the first and second optical detectors 60 and 70 to determine a gain "$k_1$" for the recorded area. Using the gain "$k_1$", the signal generator 2 generates a tracking error signal (TE) from which an offset caused by the lens movement has been canceled. When receiving the tracking error signal (TE), the controller performs real-time tracking servo control by driving the actuator (not shown) so that the lens unit 40 moves in a radial direction to follow the track.

Upon moving to the non-recorded area during a recording operation, the signal generator 2 corrects the tracking error signal (TE) using the gain "$k_2$" for the non-recorded area. When receiving the corrected tracking error signal (TE), the controller 3 performs tracking servo control according to the corrected signal (TE) to allow the lens unit 40 to follow the track. The gain "$k_2$" for the non-recorded area is determined by detecting the intensity of reflected light received by the second optical detector 70 for each of the recorded and non-recorded areas and then multiplying the gain "$k_1$" for the recorded area by the ratio of the detected intensities of the reflected light. The gain "$k_2$" for the non-recorded area may be calculated before a data recording operation and then be stored on a memory for the signal generator 2 or be stored on the recording medium 50 to be used for the data recording operation. Alternatively, the gain "$k_2$" for the non-recorded area may be calculated and used upon moving to the non-recorded area from the recorded area during a data recording operation.

The gain calculation method using the intensity of light is not limited to a recording medium divided into recorded and non-recorded areas and may be applied to any recording medium including areas that provide different intensities of light.

The present invention provides a recording/reproducing apparatus and a tracking control method for the same which have a variety of advantages.

For example, light radiated to a recording medium can accurately follow a track on the recording medium to perform reliable data processing.

In addition, it is possible to compensate a tracking error signal for an optical offset caused by lens movement and an offset caused by different reflectances of areas on the recording medium.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A tracking control method comprising:
    separating light reflected from a recording medium into first and second reflected light and receiving the first and second reflected light;
    generating a tracking error signal by compensating for an offset of a difference signal produced from the second reflected light using a difference signal produced from the first reflected light, the compensation for an offset is proceeded by subtracting the difference signal produced from the first reflected light according to a gain from the difference signal produced from the second reflected light; and
    controlling light to follow a track on the recording medium using the tracking error signal,
    wherein the gain is determined by applying a sinusoidal wave to the tracking error signal and then determining a value of the gain, at which an interval between maximum and minimum values of the tracking error signal including the sinusoidal wave applied thereto is minimized, while changing the value of the gain.

2. The tracking control method according to claim 1, wherein light radiated to the recording medium passes through a highly refractive lens so that part of the radiated light is distorted and the distorted light reflected from the recording medium is separately received as the first reflected light.

3. The tracking control method according to claim 1, wherein the tracking error signal is generated as expressed by the following equation:

$$TE = (A-B) - k(C-D),$$

where "$(A-B)$" denotes the difference signal produced from the second reflected light, "$(C-D)$" denotes the difference signal produced from the first reflected light, and "$k$" denotes the gain corresponding to a ratio between changes in the difference signals according to lens movement.

4. The tracking control method according to claim 3, wherein the gain is determined from a ratio between a change in the difference signal produced from the first reflected light and a change in the difference signal produced from the second reflected light according to lens movement.

5. The tracking control method according to claim 3, wherein the gain is determined from a ratio between a change in the difference signal produced from the first reflected light and a change in the difference signal produced from the second reflected light according to lens movement.

6. A tracking control method comprising:
    separating light reflected from a recording medium into first and second reflected light and receiving the first and second reflected light;
    generating a tracking error signal by compensating for an offset of a difference signal produced from the second reflected light using a difference signal produced from the first reflected light, the compensation for an offset is proceeded by subtracting the difference signal produced from the first reflected light according to a gain from the difference signal produced from the second reflected light; and controlling light to follow a track on the recording medium using the tracking error signal, wherein the gain is determined by applying a sinusoidal wave to the tracking error signal and then determining a value of the gain, at which an interval between maximum and minimum values of the tracking error signal including the sinusoidal wave applied thereto is minimized, while changing the value of the gain, wherein different tracking error signals are generated for areas on the recording medium having different reflectances.

7. The tracking control method according to claim 6, wherein the different tracking error signals for the areas on the recording medium having different reflectances are generated according to different gains.

8. The tracking control method according to claim 7, wherein, for each of the areas having different reflectances, the gain is determined from a ratio between relative changes in the difference signal produced from the first reflected light and the difference signal produced from the second reflected light according to lens movement.

9. The tracking control method according to claim 7, wherein, when the recording medium includes first and second areas having different reflectances, gains for tracking error signals for the first and second areas are determined by first determining a gain for the tracking error signal for the first area and then determining a gain for the tracking error signal for the second area according to a ratio between an intensity of light detected in the first area and an intensity of light detected in the second area.

10. The tracking control method according to claim 9, wherein the gain for the second area is determined by detecting intensities of light reflected from the first and second areas and multiplying the gain for the first area by a ratio between the detected light intensities.

11. The tracking control method according to claim 9, wherein the gain for the second area is calculated as expressed by the following equation:

$$k_2 = k_1 \frac{\text{light intensity detected in second area } (y)}{\text{light intensity detected in first area } (x)},$$

where "$k_1$" denotes the gain for the first area and "$k_2$" denotes the gain for the second area.

12. The tracking control method according to claim 9, wherein the gain for the first area is determined from a ratio between relative changes in the difference signal produced from the first reflected light and the difference signal produced from the second reflected light according to lens movement in the first area.

13. The tracking control method according to claim 9, wherein the gain for the first area is determined by applying a sinusoidal wave to the tracking error signal for each of the first and second areas having different reflectances and then determining a value of the gain for the first area, at which an interval between maximum and minimum values of the tracking error signal including the sinusoidal wave applied thereto is minimized, while changing the value of the gain for the first area.

14. A recording/reproducing apparatus comprising:

an optical separator for separating received light, which is reflected from a recording medium after being radiated to the recording medium through a lens located at the same position, into beams of reflected light;

first and second optical detectors for receiving the separated beams of the reflected light;

a signal generator for generating a tracking error signal by subtracting a difference signal produced by the first optical detector according to a gain from a difference signal produced by the second optical detector, wherein the gain is determined by applying a sinusoidal wave to the tracking error signal and then determining a value of the gain, at which an interval between maximum and minimum values of the tracking error signal including the sinusoidal wave applied thereto is minimized, while changing the value of the gain; and a controller for outputting a control signal to follow a track on the recording medium according to the tracking error signal.

15. The recording/reproducing apparatus according to claim 14, wherein the second optical detector receives one of the separated beams of the reflected light and generates an RF signal; and the first optical detector receives another of the separated beams of the reflected light and generates a gap error signal.

16. The recording/reproducing apparatus according to claim 15, wherein the first optical detector receives light reflected from a surface of the recording medium and the second optical detector receives light reflected from a recording layer of the recording medium.

17. The recording/reproducing apparatus according to claim 14, wherein the gain is a ratio between relative changes in a signal produced from light received by the first optical detector and a signal produced from light received by the second optical detector according to lens movement.

18. The recording/reproducing apparatus according to claim 14, wherein the signal generator corrects track error signals for areas on the recording medium having different reflectances using a ratio of intensities of the reflected light from the areas having different reflectances.

19. The recording/reproducing apparatus according to claim 18, wherein respective tracking error signals for first and second areas on the recording medium having different reflectances are calculated as expressed by the following equations:

$$TE_1 = (A-B) - k_1(C-D)$$

$$TE_2 = (A-B) - k_2(C-D),$$

and the relationship between the gains for the first and second areas is calculated as expressed by the following equation:

$$k_2 = k_1 \frac{\text{light intensity detected in second area } (y)}{\text{light intensity detected in first area } (x)},$$

where "$TE_1$" denotes the tracking error signal for the first area, "$TE_2$" denotes the tracking error signal for the second area, "$k_1$" denotes the gain for the first area, and "$k_2$" denotes the gain for the second area.

* * * * *